United States Patent
Barnett et al.

(10) Patent No.: US 7,903,562 B2
(45) Date of Patent: Mar. 8, 2011

(54) METHOD AND SYSTEM FOR CONGESTION CONTROL

(75) Inventors: Bruce Gordon Barnett, Troy, NY (US); Richard Louis Zinser, Niskayuna, NY (US)

(73) Assignee: Lockheed Martin Corporation, Bethesda, MD (US)

(*) Notice: Subject to any disclaimer, the term of this patent is extended or adjusted under 35 U.S.C. 154(b) by 230 days.

(21) Appl. No.: 12/068,329

(22) Filed: Feb. 5, 2008

(65) Prior Publication Data

US 2009/0196182 A1   Aug. 6, 2009

(51) Int. Cl.
*H04J 1/16* (2006.01)
*H04J 3/16* (2006.01)

(52) U.S. Cl. ........................ 370/235; 340/465
(58) Field of Classification Search .................. 370/235, 370/465
See application file for complete search history.

(56) References Cited

U.S. PATENT DOCUMENTS

| | | | | |
|---|---|---|---|---|
| 6,173,323 | B1* | 1/2001 | Moghe | 709/224 |
| 2003/0088690 | A1* | 5/2003 | Zuckerman et al. | 709/232 |
| 2003/0236827 | A1 | 12/2003 | Patel et al. | |
| 2004/0213265 | A1* | 10/2004 | Oueslati et al. | 370/395.42 |
| 2006/0156164 | A1* | 7/2006 | Meyer et al. | 714/749 |
| 2007/0165524 | A1* | 7/2007 | Mascolo | 370/230 |
| 2007/0297414 | A1* | 12/2007 | Gupta et al. | 370/395.4 |
| 2008/0198792 | A1* | 8/2008 | Kim et al. | 370/320 |
| 2008/0304413 | A1* | 12/2008 | Briscoe et al. | 370/235 |
| 2009/0006920 | A1* | 1/2009 | Munson et al. | 714/748 |
| 2009/0185488 | A1* | 7/2009 | Beverly et al. | 370/236 |

FOREIGN PATENT DOCUMENTS

EP   1450514   8/2004

* cited by examiner

*Primary Examiner* — Andrew Lee
(74) *Attorney, Agent, or Firm* — Oliff & Berridge, PLC (57) ABSTRACT

Aspects of the disclosure provide a method for congestion control by implementing congestion aware applications. The congestion aware applications can adjust an occupancy of network resource according to a network congestion status. The method for congestion control can include transmitting data from an application to a transport protocol at a first data rate, transmitting the data over a channel, receiving a feedback signal from the transport protocol that is indicative of a congestion status of the channel, communicating the congestion status of the channel from the transport protocol to the application, and transmitting data from the application to the transport protocol at a second data rate based on the congestion status.

24 Claims, 7 Drawing Sheets

METHOD AND SYSTEM FOR CONGESTION CONTROL

BACKGROUND

Network congestion can affect communication quality, especially for real time communications, such as voice over internet protocol (VoIP), online gaming, video conference, and the like. In a video conference example, video image data packets can be piled up in a buffer of a router during times of heavy network congestion, and therefore, video image transmission delay can be long. Worse yet, the video image data packets can be dropped by the router when the buffer is low on storage space, which can result in a video conference image that is choppy. On the other hand, real time communications can attempt to occupy a large amount of network communication resources, which can increase network congestion. For example, a video conference may transmit high resolution video image in an already congested network, and thus exacerbate an already bad network congestion situation.

In a technique to relieve network congestion, transport protocols, such as TCP, can slow down packet sending rate, and thus reduce an amount of packets that enter the network. In another technique, a router can selectively drop low priority packets, while permitting high priority packets go through.

SUMMARY

However, the transport protocol based technique may increase undesirable latency that can be noticeable to clients. Therefore, the transport protocol based technique may not be applicable to applications that require low latency and a substantially constant sending rate, such as the video conference application. Further, the router based technique may entirely block a low priority application, which can result in unfair network allocation to owners of the low priority applications. In addition, unawareness of network congestion status may lead to congestion collapse, which can be difficult to recover.

Aspects of the disclosure provide a method for congestion control by implementing congestion aware applications. The congestion aware applications can adjust an occupancy of network resource according to a network congestion status. The network congestion status can include high congestion that the network does not have enough resources for existing applications and low congestion that the network has enough resources for existing applications in the network. The method for congestion control can include transmitting data from an application to a transport protocol at a first data rate, transmitting the data over a channel, receiving a feedback signal from the transport protocol that is indicative of a congestion status of the channel, communicating the congestion status of the channel from the transport protocol to the application, and transmitting data from the application to the transport protocol at a second data rate based on the congestion status.

According to an aspect of the disclosure, the feedback signal can include at least one of loss rate, round trip time, explicit congestion notification (ECN), error rate and receiver estimated receiving data rate. The congestion status can correspond to an average of the feedback signal or the congestion status can correspond to a sample of the feedback signal.

To transmit data from the application to the transport protocol at the first data rate, the method can further include encoding the data with a first coder that matches the first data rate. Similarly, to transmit data from the application to the transport protocol at the second data rate based on the congestion status, the method can include switching to a second coder that matches the second data rate based on the congestion status.

According to aspects of the disclosure, when the network experiences high congestion, the second data rate is lower than the first data rate. On the other hand, when the network experiences low congestion, the second data rate is higher than the first data rate.

Furthermore, to transmit data over the channel, the disclosure can include transmitting extra data with the encoded data by the first coder over the channel to test if the channel can adapt to higher data rate.

Aspects of the disclosure also provide a system for congestion control, the system can include a transport protocol configured to transmit data over a channel, and receive a feedback signal that is indicative of a congestion status of the channel, and an application configured to transmit the data to the transport protocol at a first data rate, receive the feedback signal from the transport protocol, and transmit the data to the transport protocol at a second data rate based on the congestion status.

Further, the system can include an interface that is coupled to the transport protocol and the application, the interface being configured to transmit data from the application to the transport protocol, and communicate the feedback signal from the transport protocol to the application. In an embodiment, the interface includes an application programming interface (API) of an operating system.

In addition, the application can include a first coder that is configured to match the first data rate, and a second coder that is configured to match the second data rate. The application can be configured to encode data with the first coder, transmit the encoded data to the transport protocol, receive the feedback signal that is indicative of the congestion status, and switch to the second coder based on the congestion status.

When the second data rate is higher than the first data rate, the application can be further configured to transmit extra data with the encoded data by the first coder to the transport protocol, and switch to the second coder when the network experiences low congestion.

Aspects of the disclosure further provide a computer readable medium storing program instructions causing a controller to perform congestion control steps that can include transmitting data from an application to a transport protocol at a first data rate, transmitting the data over a channel, receiving a feedback signal from the transport protocol that is indicative of a congestion status of the channel, communicating the congestion status of the channel from the transport protocol to the application, and transmitting data from the application to the transport protocol at a second data rate based on the congestion status.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF EMBODIMENTS

Figure 1:
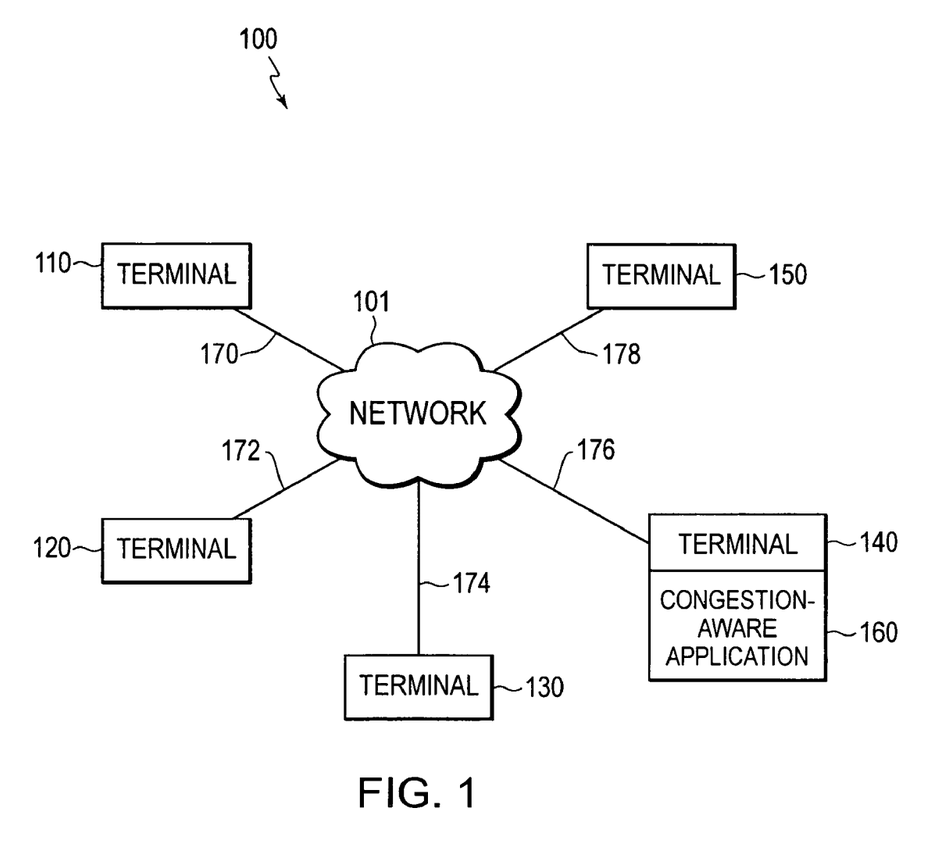
FIG. 1 shows a block diagram of an exemplary congestion control network communication system.

FIG. 1 shows a block diagram of an exemplary congestion control network communication system 100 according to the disclosure. As shown in FIG. 1, the exemplary congestion control network communication system 100 can include a network 101, and a plurality of terminals 110, 120, 130, 140 and 150 that can be coupled to the network 101 via communication link 170, 172, 174, 176 and 178, respectively. Among the plurality of terminals, at least one terminal, such as terminal 140, can be a congestion control terminal, which can include a congestion aware application 160.

The network 101 and the communication link 170-178 can provide communication channels among the plurality of terminals 110-150. The network 101 can be wired, wireless, a local area network (LAN), a wide area network (WAN), a peer-to-peer network, the Internet, etc. or any combination of these that interconnects terminal 110-150. The communication link 170-178 can be any type of wired or wireless link, including, but not limited to, multiple twisted pair cables, DSL, coaxial cable, fiber optics, RF cable modems, over-the-air frequency, over-the-air optical wavelength (e.g. infrared), local area networks, wide area networks, intranets, internet, virtual private networks, cable TV, terrestrial broadcast radio or television, satellite transmission, simple direct serial/parallel wired connections, or the like, or combinations of the these.

The terminals 110-150 can include various applications, such as the congestion aware application 160, that can utilize the network 101 and the communication link 170-178 to communicate with other terminals. The congestion aware application 160 may monitor a congestion status of the network 101, and can adjust resource occupancy of the network 101, such as bandwidth, according to the congestion status of the network 101. The congestion status can include a high congestion that the network 101 does not have enough bandwidth for existing applications in the network 101, and a low congestion that the network 101 has enough bandwidth for exiting applications in the network 101.

As an example of the congestion aware application 160, a congestion aware voice over internet protocol (VoIP) application can include a time domain voicing cutoff (TDVC) vocoder and an internet low bit-rate codec (iLBC) vocoder. Between the TDVC and the iLBC vocoders, the iLBC vocoder can have higher quality with larger network 101 bandwidth occupancy, while the TDVC vocoder can have lower but acceptable quality, with less network 101 bandwidth occupancy.

During operation, the congestion aware VoIP application can monitor the network 101 congestion status, and switch to the appropriate vocoder according to the monitored network 101 congestion status. More specifically, while the iLBC vocoder is in utilization, the congestion aware VoIP application can monitor if the network 101 experiences high congestion. When the network 101 experiences high congestion, the congestion aware VoIP application can switch to the TDVC vocoder to occupy less network 101 bandwidth in an attempt to relieve the network 101 congestion. On the other hand, while the TDVC vocoder is in utilization, the congestion aware VoIP application can monitor if switching to iLBC vocoder can result in high congestion of the network 101. When the network 101 can adapt to the iLBC vocoder without high congestion, the congestion aware VoIP application may switch to the iLBC vocoder.

Figure 2:
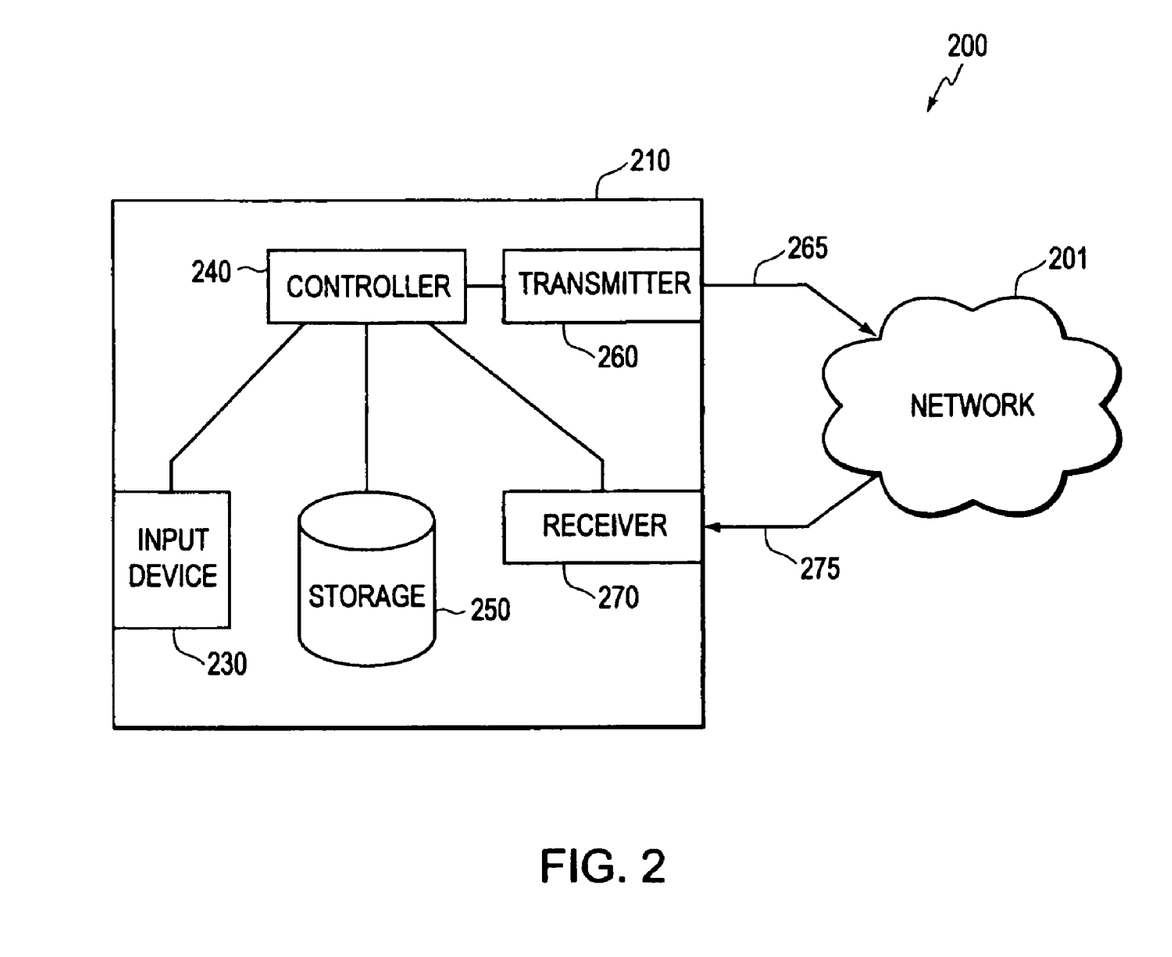
FIG. 2 shows a block diagram of an exemplary congestion control terminal.

FIG. 2 shows a block diagram of an exemplary congestion control terminal 210 coupled to a network 201. The exemplary congestion control terminal 210 can include a transmitter 260 that can transmit data to the network 201, a receiver 270 that can receive data from the network 201, and a terminal controller 240 coupled to the transmitter 260 and the receiver 270. The terminal controller 240 can control the transmitter 260 to transmit data at a transmitting rate, and can observe the data received by the receiver 270.

Furthermore, the exemplary congestion control terminal 210 can include an application specific device, such as input device 230 and storage medium 250, coupled with the terminal controller 240. In the congestion aware VoIP application example, the input device 230, such as a standard telephone, can convert voice into an electrical signal, and transmit the electrical signal to the terminal controller 240. The terminal controller 240 can digitalize the electrical signal into a digital signal. Further, the terminal controller 240 can encode the digital signal into an encoded digital signal according to the congestion status of the network 201, and control the transmitter 260 to transmit the encoded digital signal over the network 201. More specifically, the terminal controller 240 can use a coder having high data rate to encode the digital signal when the network 201 experiences low congestion, thus to provide high quality of service. On the other hand, the terminal controller 240 can use a coder having low data rate to encode the digital signal when the network 201 experiences high congestion. On a receiver terminal (not shown), the encoded digital signal can be decoded, and output to an output device (not shown). It should be understood that a terminal can include an input device and an output device integrated, such as a telephone.

In a video broadcasting example, the storage medium 250 can store previously recorded video data. The terminal controller 240 can process the video data, such as compress the video data, according to the congestion status of the network 201, and control the transmitter 260 to transmit the processed video data. More specifically, the terminal controller 240 may use a lossless compressor to compress the video data when the network 201 experiences low congestion, and use a lossy compressor to compress the video data when the network 201 experiences high congestion. The compressed video data can be received by a receiver terminal (not shown). The receiver terminal can decompressed the received video data, and can include a video display device (not shown) that can display the video image according to the decompressed video data.

Figure 3:
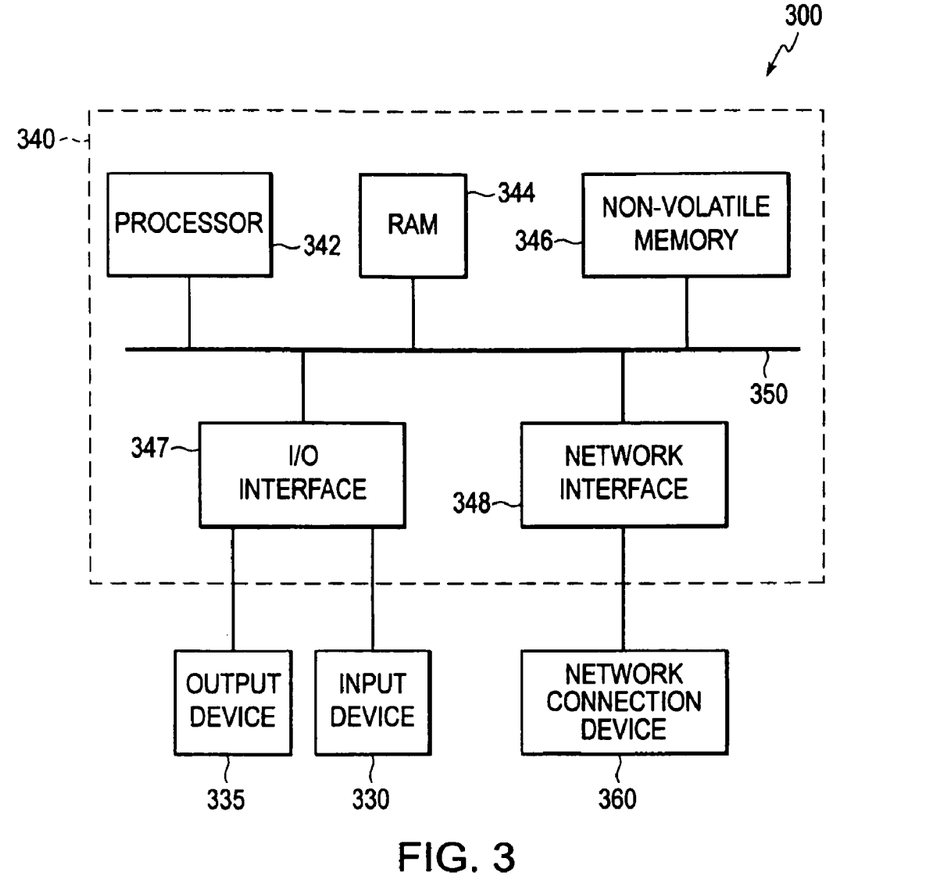
FIG. 3 shows a more detailed block diagram of an exemplary congestion control terminal.

FIG. 3 shows another block diagram of an exemplary congestion control terminal 300. The exemplary congestion control terminal 300 can include a terminal controller enclosed in block 340, a network connection device 360, and an input device 330. The exemplary congestion control terminal 300 can process an input signal, send the processed input signal over a network according to a network congestion status. In addition, the exemplary terminal 300 can include an output device 335, therefore, the exemplary congestion control terminal 300 can receive a processed input signal from another terminal. For example, a VoIP terminal can process and send voice data over the network, and can receive voice data from the network, and output voice sound according to the voice data.

The network connection device 360, such as USB, Ethernet, IEEE 1394, wireless signal emitting device, and the like, can enable the congestion control terminal 300 to be connected to a network. The network connection device 360 can integrate a transmitter and a receiver, and can be configured to transmit data to the network and receive data from the network.

The input device 330, such as telephone, camera, keyboard and PDA, can be configured to convert inputs, such as voice, image, key-strike, handwriting, and the like, into electrical signals, either analog or digital. The output device 335, such as telephone, monitor, PDA, and the like, can be configured to convert the received data to a user perceivable format, such as sound and image.

The terminal controller 340 can perform data operation and coordinate components of the terminal 300. For example, the terminal controller 340 can receive an electrical signal, then process, such as digitalize and encode, the electrical signal into a digital data stream, and control the network connection device 360 to send the data stream. In addition, the terminal controller 340 can observe the data received by the network connection device 360, and determine the network congestion status based on the received data.

The terminal controller 340 can further include a processor 342, a random access memory (RAM) 344, a non-volatile memory 346, an I/O interface 347 and a network interface 348 coupled as shown. The I/O interface 347 can enable various input devices, output devices, or input and output devices to connect to the terminal controller 340. The network interface 370 can enable various network connection devices to connect to the terminal controller 340.

The processor 342 can execute system instructions to maintain the terminal controller 340. More specifically, the processor 342 may execute an operating system, such as Linux, to maintain the congestion control terminal 300. The operating system can perform various system functions, such as memory management, task scheduling, interrupt handling, and the like. In addition, the operating system can generally include network software, such as network protocols, that can provide network service.

Further, the processor 342 can execute application instructions to perform specific applications. Some applications may require access to network service, such as a VoIP application. Generally, those applications can be implemented in a network architecture, which can include network protocols that can provide communication ability over the network, and an application programming interface (API) provided by the operating system, which can enable the communication ability between those applications and the network protocols.

The non-volatile memory 346 can hold information even when power is off. Therefore, the non-volatile memory 346 can be used to store system and application instructions. It should be understood that the non-volatile memory 346 may include various non-volatile memory devices, such as battery backup RAM, read only memory (ROM), programmable ROM (PROM), flash PROM, electrical erasable PROM (EEPROM), magnetic storage, optical storage, and the like.

The RAM 344 is readable and writable. Generally, the RAM 344 can have fast access speed. It can be preferred that data and instructions are stored in the RAM 344 during operation, such that the processor 342 can access the RAM 344 for instructions and data instead of the non-volatile memory 346. Thus, the system performance can be improved.

In an embodiment, the congestion aware application can be implemented as congestion aware application instructions stored in the non-volatile memory 346. The congestion aware application instructions can cause the processor 342 to perform congestion control operations. In another embodiment, the congestion aware application can be implemented as hardware, such as application specific integrated circuit (ASIC), included with the processor 342. Moreover, the congestion aware application can be implemented as a combination of application instructions and hardware.

During operation of a congestion aware application, the processor 342 can execute the system instructions and application instructions stored in the RAM 344 or non-volatile memory 346. The processor 342 can control the I/O interface to receive input data, such as sampled digital data of voice, and then process the input data, and send the processed input data to the network via network interface 348. Further, the processor 342 can observe data received from the network interface 348. The processor 342 can determine a congestion status of the network based on the data received, and adjust input data processing accordingly.

Further, the terminal controller 340 may include a bus 350 that can couple various components of the terminal controller 340 together, and coordinate operations of the various components. For the easy and clarity of description, the embodiments are presented with a bus type architecture, however, it should be understood that any other architectures can also be used to couple components inside the terminal controller 340.

Figure 4:
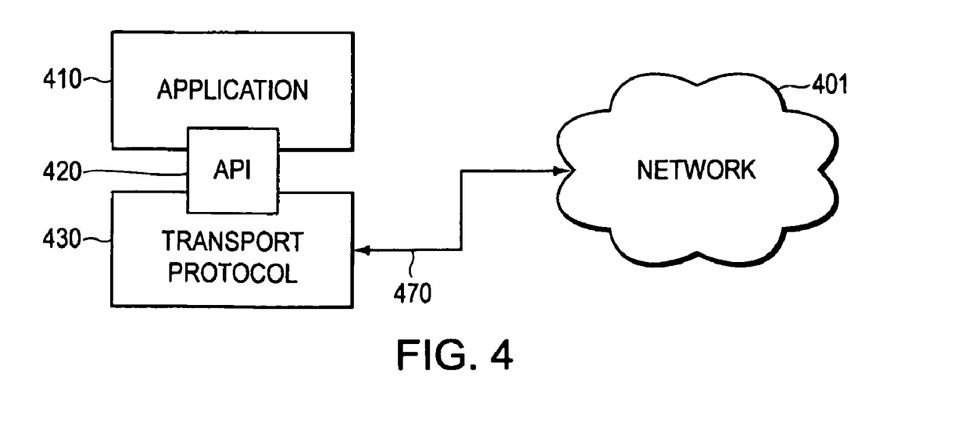
FIG. 4 shows an exemplary network architecture diagram of an exemplary congestion control system.

FIG. 4 shows a diagram of an exemplary congestion control network architecture according to the disclosure. The exemplary congestion control network architecture can include a congestion aware application 410 and a transport protocol 430 couple to a network 401. In addition, the exemplary congestion control network architecture can include an interface, such as API 420 provided by an operating system, coupled to the congestion aware application 410 and the transport protocol 430.

The congestion aware application 410 of the exemplary congestion control network architecture can perform a specific application according to the network congestion status. For example, a congestion aware VoIP application can encode voice data using a high data rate vocoder when the network 401 experiences low congestion, and encode voice data using a low data rate vocoder when the network 401 experiences high congestion.

The transport protocol 430 can send data to the network 401 according to a network transport protocol, such as transmission control protocol (TCP), user datagram protocol UDP, datagram congestion control protocol (DCCP), and the like. Further, the transport protocol may receive information, such as data or acknowledgment (ACK) from the network 401. According to the disclosure, the information received can indicate a congestion status of the network, such as low congestion or high congestion. In an embodiment, the transport protocol can include DCCP, therefore, the received information can include a receiver estimated sending rate. The receiver estimated sending rate can be used to indicate a congestion status of the network 401. For example, when the receiver estimated sending rate does not match the real sending rate, which can mean that the network 401 experiences high congestion, and thus data can be lost in the network 401, therefore the receiver does not receive all the data sent out. When the receiver estimated sending rate matches the real sending rate, the network 401 can experience low congestion that substantially all the sent data can be received by the receiver.

In addition to the receiver estimated sending rate, other parameters, such as round trip time, loss rate, and the like, can be used to indicate the congestion status of the network 401. Moreover, the transport protocol can include an explicit congestion notification (ECN) bit. Therefore, routers that can detect the congestion can toggle the ECN bit to inform the congestion status of the network 401. Furthermore, the receiver may calculate a parameter, such as an error rate, from the data received that can be independent of transport protocols to indicate the congestion status of the network 401, and inform the congestion aware application 410 of the parameter.

During an exemplary operation, the congestion aware application 410 can send application data to the transport protocol 430 via the API 420. The transport protocol 430 can packetize the application data, and transport the application data to the network 401. Further, the transport protocol 430 can receive information that can indicate the network congestion status, and communicate the received information to the congestion aware application 410 via the API 420. Therefore, the congestion aware application 410 can adjust data rate of the application data according to the received information.

Figure 5:
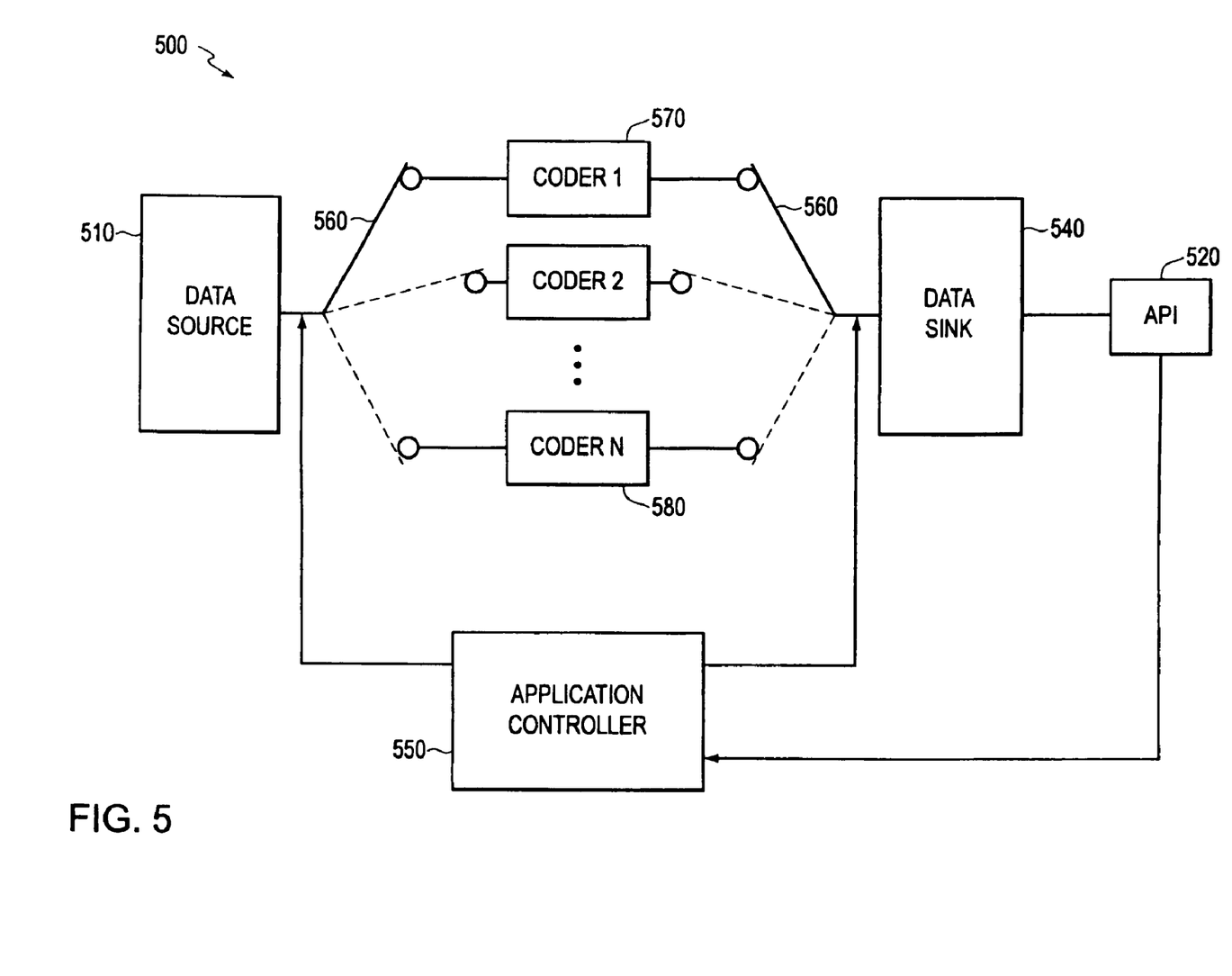
FIG. 5 shows a block diagram of an exemplary congestion-aware application.

FIG. 5 shows a block diagram of an exemplary congestion aware application 500. The exemplary congestion aware application 500 can include a data source 510 that can provide input data, a plurality of coders 570-580 that can encode the input data, a data sink 540 coupled to an API 520 that can output the encoded data to the API 520, and a switch 560 that can connect one of the plurality of coders 570-580 between the data source 510 and the data sink 540. In addition, the exemplary congestion aware application 500 can include an application controller 550 coupled with the API 520 and the switch 560. The application controller 550 can be configured to receive information that can indicate the network congestion status from the API 520, and control the switch 560 to select an appropriate coder according to the congestion status of the network.

The data source 510 can provide input data to the plurality of coders. In the congestion aware VoIP example, the data source 510 can be an I/O interface that can provide digitalized voice sampling data. In a video broadcasting example, the data source can be a storage interface connecting to a storage medium that can provide the pre-stored video data.

The plurality of coders 570-580 may encode the input data with different quality. In the congestion aware VoIP example, the plurality of coders 570-580 can be a plurality of vocoders that can encode a voice signal with different quality. For example, the vocoder 570 can be an iLBC vocoder that can encode the voice signal with higher quality, while the vocoder 580 can be a TDVC vocoder that can encode the voice signal with relatively lower quality. On the other hand, the iLBC vocoder 570 can have higher data rate compared to the TDVC vocoder 580. Therefore, the iLBC vocoder 570 can require larger network bandwidth compared to the TDVC vocoder 580. The data sink 540 can format and packetize the encoded data, and send the data to a transport protocol via the API 520.

During an exemplary operation process, the application controller 550 can control the switch 560 to select a default coder at an initial time. The default coder can encode the input data from the data source 510, and output the encoded data to the data sink 540. The data sink 540 can then send the encoded data to the transport protocol via API 520. The transport protocol can then transport the encoded data to the network. In addition, the transport protocol can receive information that can indicate the congestion status of the network, and communicate the congestion status of the network to the application controller 550 via API 520. Then the application controller 550 can control the switch 560 to select an appropriate coder based on the congestion status of the network.

In the congestion aware VoIP example, the application controller 550 can control the switch 560 to select the iLBC vocoder 570 initially. The iLBC vocoder 570 can encode the input voice data with high quality. The encoded data can have high data rate that can require larger network bandwidth. If the network does not have enough bandwidth, the network can experience high congestion. Therefore, some encoded data can be dropped by the network, and cannot arrive at the receiver. In an embodiment, the receiver can estimate a sending rate based on the data received, and send this information back to the sender via the network. On the sender side, the transport protocol can receive the receiver estimated sending rate, and communicate the receiver estimated sending rate to the application controller 550 via the API 520. The application controller 550 can compare the receiver estimated sending rate with the data rate of the iLBC vocoder. Due to the lost data in the network, the receiver estimated sending rate cannot match the data rate of the iLBC vocoder. Therefore, the application controller 550 can determine that the network experiences high congestion. The application controller 550 can control the switch 560 to choose the TDVC vocoder 580 that requires less network bandwidth.

Figure 6:
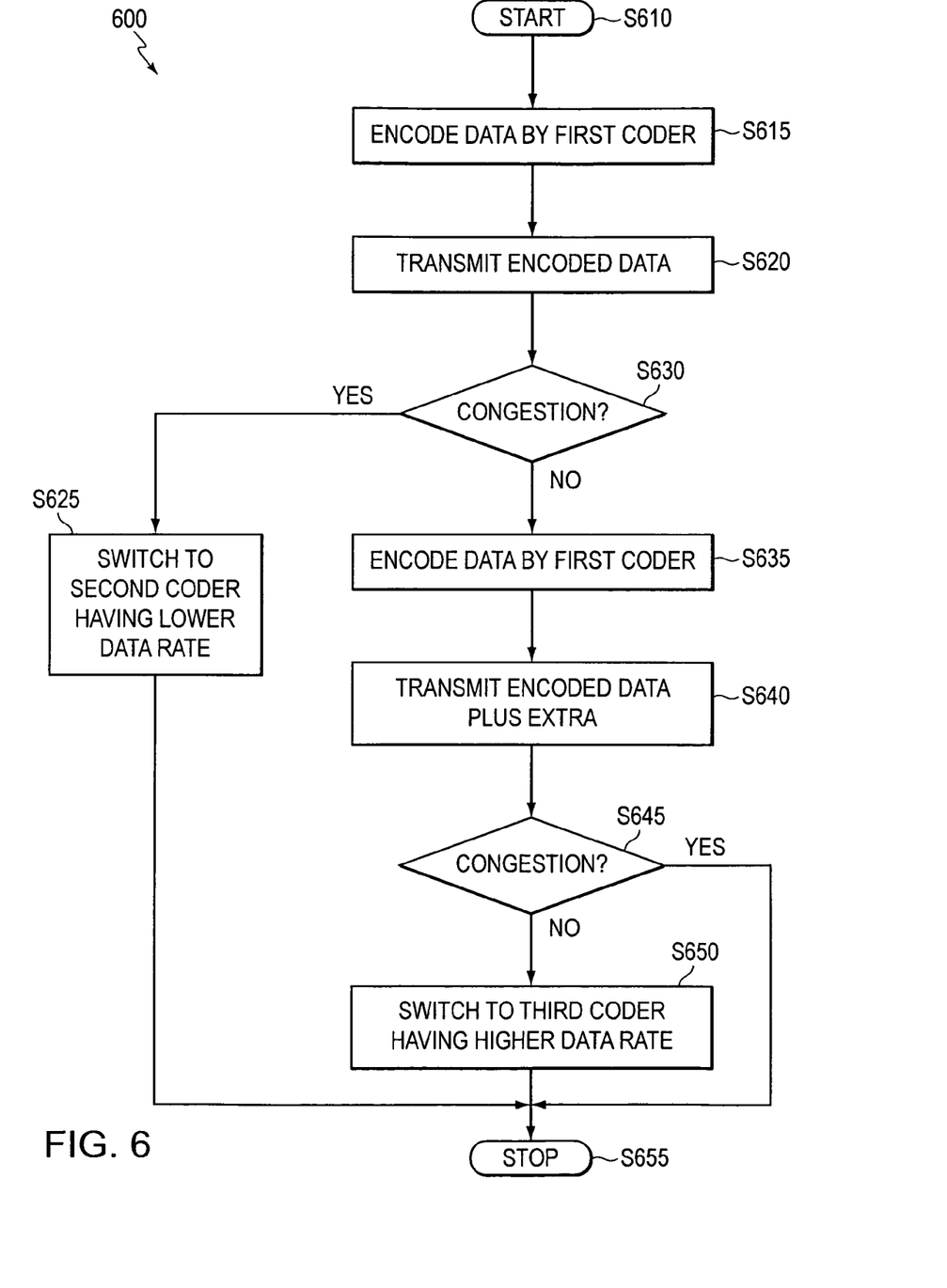
FIG. 6 shows a flow chart outlining an exemplary congestion control process.

FIG. 6 shows a flow chart outlining an exemplary congestion control process. The exemplary congestion control process starts at step S610, and proceeds to step S615 where a first coder of a congestion aware application can encode input data at a time. Then the process proceeds to step S620, where the encoded data can be sent to a transport protocol, such as via API, and then the transport protocol can transmit the encoded data to a receiver via a network.

Subsequently, the process proceeds to step 630, where a network congestion status can be determined. In an embodiment, the transport protocol can receive information, such as receiver estimated sending rate, that can indicate of network congestion status. The transport protocol can communicate this received information with the congestion aware application, such as via API. The congestion aware application can determine whether the network experiences high congestion based on the received information.

In an embodiment, the congestion aware application can determine the network congestion status based on an average parameter, such as an average receiver estimated sending rate, over a period. In another embodiment, the congestion aware application can determine the network congestion status based on a sample of the parameter, such as a sample of the receiver estimated sending rate, therefore, the congestion aware application can response to network congestion quickly.

If the network experiences high congestion, the process proceeds to step S625, where the congestion aware application can choose a second coder having lower data rate to encode the input data. Then the process proceeds to step S655 and stops. It should be understood that the second coder can include a coder that stops encoding, therefore the congestion aware application can stop sending data to the network.

If the network experiences low congestion, the process proceeds to step S635, the congestion aware application can continuously use the first coder to encode the input data. The process then proceeds to step S640, where the encoded data can be sent to the transport protocol, and then the transport protocol can transmit the encoded data to the receiver via the network. In addition, extra data, such as dummy data or extra informative data, can be transmitted via the network. Thus, more data can be sent via the network, and the sending rate can increase. In an embodiment, the extra data may provide information that can assist the congestion control process, such as transition to a next coder. The process then proceeds to step S645.

In step S645, the network congestion status can be determined. The network congestion status may change due to the extra data sent to the network, or changes in other part of the network. If the network experiences high congestion, the congestion aware application can determine to continue using the first coder and stop sending extra data, and then the process proceeds to step S655 and terminates. If the network experiences low congestion, the congestion aware application can choose a third coder having even higher data rate, and then the process proceeds to step S655 and terminates.

As described above, the congestion aware application can choose a coder having lower data rate when the network experiences high congestion, and choose a coder having higher data rate when the network can adapt without high congestion. Various algorithms can be used by the congestion aware application to determine whether the network can adapt to a higher data rate coder without high congestion. In an embodiment, the congestion aware application can apply a three-step process.

Figure 7:
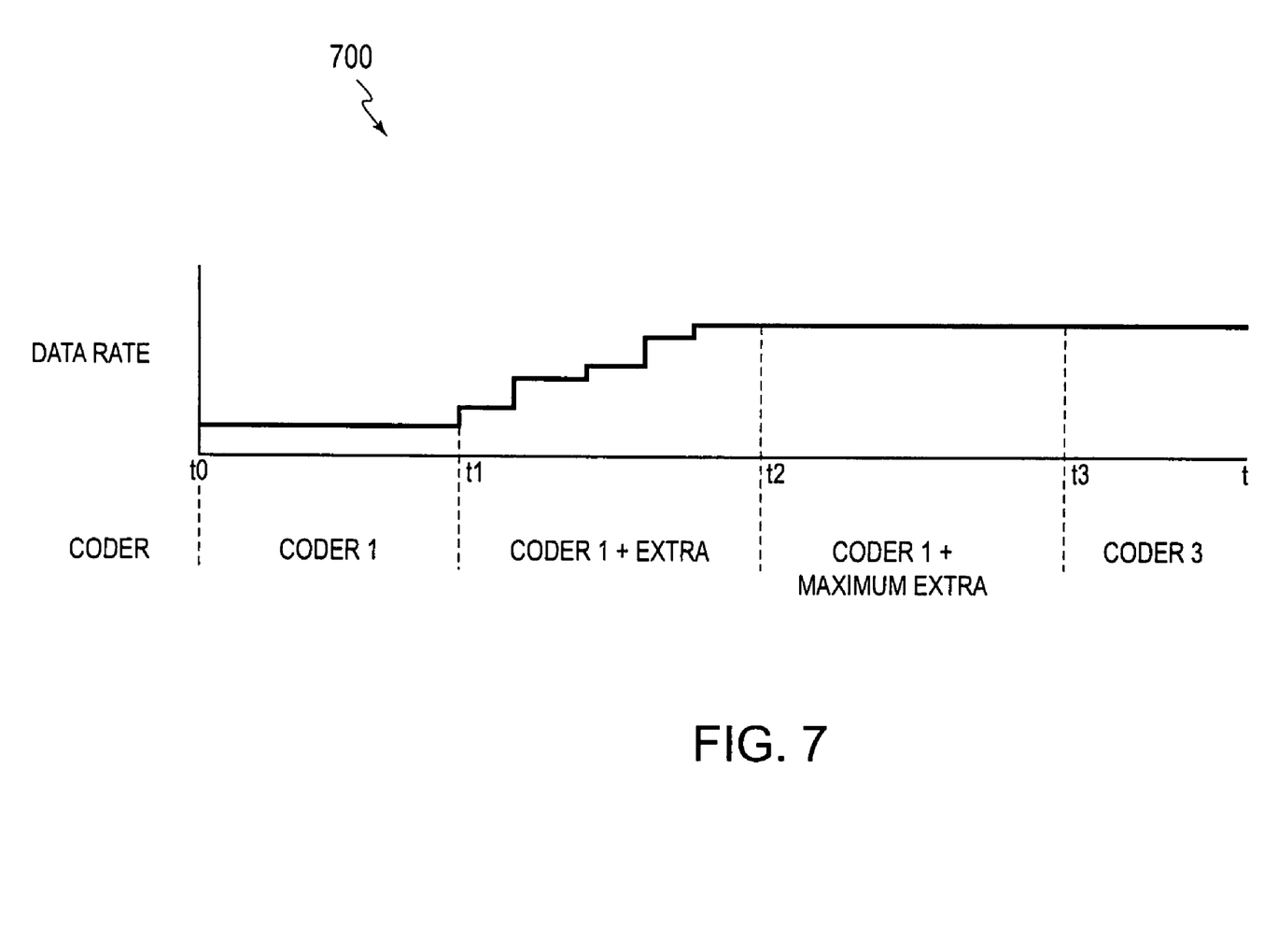
FIG. 7 shows an exemplary data sending rate diagram of an exemplary congestion control process.

FIG. 7 shows an exemplary data sending rate diagram of an exemplary three-step process. The process can include an initialization period, a data rate increase period, and a data rate stabilization period. As shown by FIG. 7, the initialization period can include a time duration between time t0 and time t1 that the congestion aware application can have a stable data sending rate matching the first coder. The data rate increase period can include a time duration between time t1 and time t2 that the congestion aware application can increase the data sending rate. The data rate stabilization period can include a time duration between time t2 and time t3 that the congestion aware application can have a stable data sending rate matching the third coder.

The three-step process starts at the initialization period. During the initialization period, the congestion aware application can use the first coder, and monitor the congestion status of the network. In an embodiment, the congestion aware application can receive a receiver estimated sending rate. The congestion aware application can determine if the receiver estimated sending rate matches the real data sending rate as illustrated in the FIG. 7. When the network continues in low congestion during the initialization period, the process may proceed to the data rate increase period. During the data rate increase period, the congestion aware application can still use the first coder. In addition, the congestion aware application can send extra data to the network in order to increase the data sending rate. The data sending rate can increase from a rate matching the first coder to a rate matching the third coder as illustrated in FIG. 7. When the network continues experiencing low congestion during the data rate increase period, the process may proceed to the data rate stabilization period. During the data rate stabilization period, the congestion aware application can still use the first coder. In addition, the congestion aware application can send extra data that can make the data sending rate match the third coder. When the network keeps in low congestion during the data rate stabilization period, the congestion aware application can switch to the third coder.

During the three-step process, the congestion aware application can monitor the congestion status of the network. If the network experiences high congestion, the congestion aware application can respond accordingly. For example, if the network experiences high congestion during the initialization period, the congestion aware application can choose the second coder having lower data rate than the first coder. If the network experiences high congestion during the data rate increase period, the congestion aware application can continue using the first coder, and stop sending extra data. If the network experiences high congestion during the data rate stabilization period, the congestion aware application can continue using the first coder, and stop sending extra data.

Figure 8:
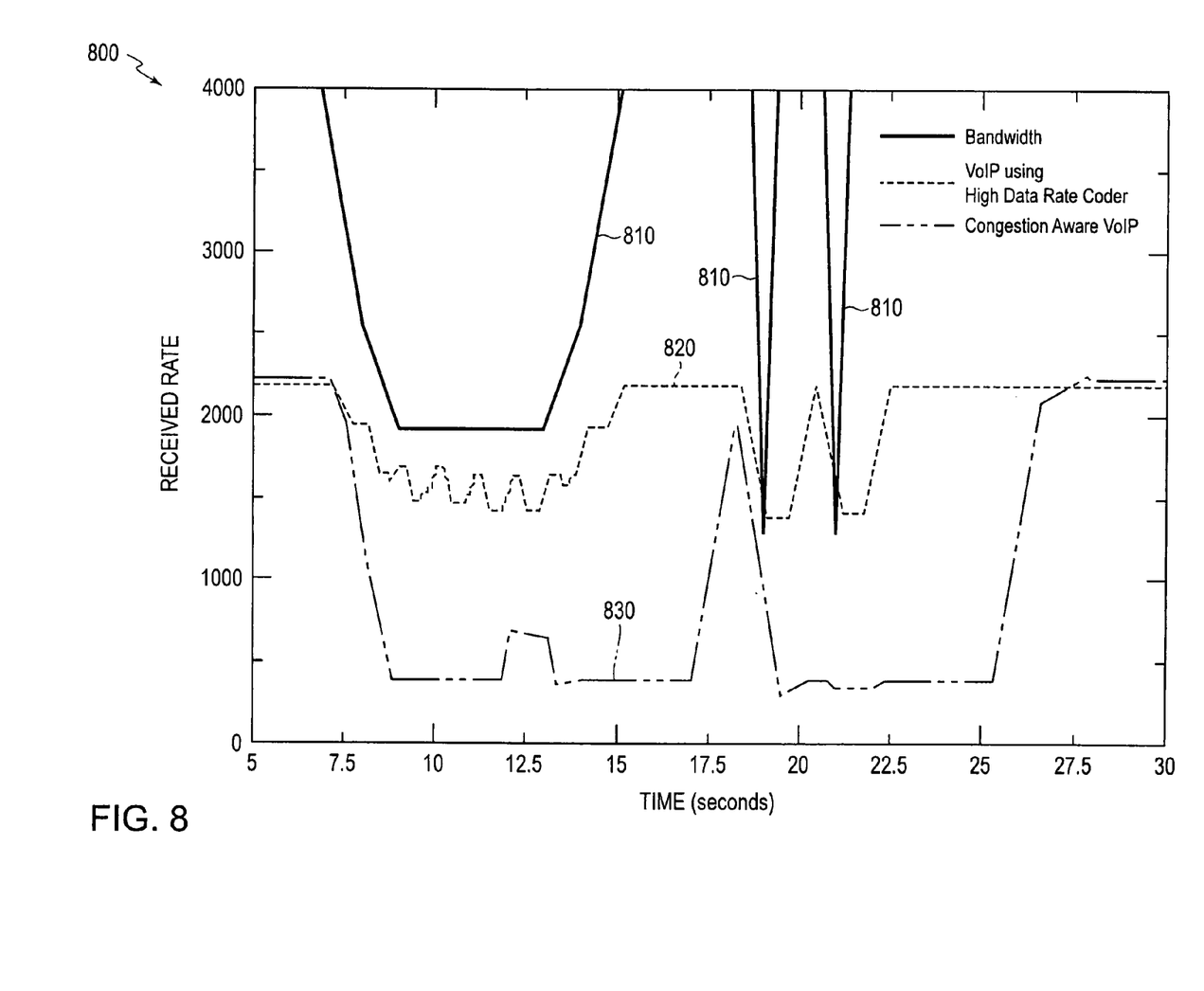
FIG. 8 shows an exemplary measurement diagram comparing two VoIP applications.

FIG. 8 shows an exemplary measurement diagram from a prototype. The exemplary measurement diagram can compare two VoIP applications—a VoIP application using high data rate and a congestion aware VoIP application. The measurement diagram shows a solid line 810 that indicates available bandwidth changing over time, and two dashed lines 820 and 830 that indicate relationships of receiver received data rate and time for two applications, respectively.

As can be seen, initially both of the VoIP applications can use high data rate coder to provide high quality of service when the network has enough bandwidth. Around time 7.5 seconds, the available bandwidth drops below the required bandwidth of the high data rate coder, which can result in losing data in the network for the VoIP application using the high data rate coder, therefore the received data rate as shown by line 820 can drop. On the other hand, the congestion aware VoIP application can select the low data rate coder that requires less bandwidth. When the available bandwidth 810 keeps low, such as between time 7.5 seconds to 15 seconds, the VoIP application using the high data rate coder can continue losing data in the network. In addition, the high data sending rate can result in the network experiencing high congestion, having no bandwidth for more applications. On the other hand, the congestion aware VoIP application can continue using the low data rate coder, therefore the network congestion can be relieved. In addition, the congestion aware VoIP application may attempt to raise the data rate by sending extra data if the network experiences low congestion for a while, such as around time 12 seconds and 17 seconds. If the network cannot adapt to the raised data rate, such as around time 13 seconds, or the available network bandwidth increase is spontaneous, such as round time 18, the congestion aware VoIP application can stop sending extra data, and continue using the low data rate coder.

Further, around time 21 seconds, when the available bandwidth 810 increases, the congestion aware VoIP application can first continue using the low data rate, such as between time 21 seconds to 25 seconds. If the network still experiences low congestion, the congestion aware VoIP application can increase the data rate by sending extra data, such as around time 25 seconds. If the network can adapt to the increased data rate without high congestion, such as around time 28 seconds, the congestion aware application may switch to the high data rate coder.

As can be seen, while the VoIP using the high data rate coder keeps using the high data rate coder when the network experiences high congestion (which may result in losing packets), the congestion aware VoIP application can switch to the low data rate coder, thus relieving the network congestion, and communication integrity (e.g. less lost packets) can be improved. On the other hand, when the network has enough bandwidth, the congestion aware VoIP application can switch to the high data rate coder in a reliable style.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A method for congestion control, comprising:
   transmitting data, via a processor, from an application of a first terminal to a transport protocol of the first terminal at a first data rate;

transmitting the data over a channel;

transmitting extra information data or dummy data over the channel to test whether or not that channel can adapt to a higher data rate;

receiving a feedback signal at the transport protocol of the first terminal from a terminal other than the first terminal that is indicative of a congestion status of the channel;

communicating the congestion status of the channel from the transport protocol of the first terminal to the application of the first terminal; and transmitting data from the application of the first terminal to the transport protocol of the first terminal at a second data rate based on the congestion status.

2. The method according to claim 1, wherein the feedback signal is at least one of loss rate, round trip time, explicit congestion notification (ECN), error rate and receiver estimated receiving data rate.

3. The method according to claim 1, wherein the congestion status corresponds to an average of values of the feedback signal over a period.

4. The method according to claim 1, wherein the congestion status corresponds to a sample of values of the feedback signal over a period.

5. The method according to claim 1, wherein
transmitting data from the application of the first terminal to the transport protocol of the first terminal at the first data rate, further comprises encoding the data with a first coder that matches the first data rate; and transmitting data from the application of the first terminal to the transport protocol of the first terminal at the second data rate based on the congestion status, further comprises switching to a second coder that matches the second data rate based on the congestion status.

6. The method according to claim 5, when the congestion status experiences high congestion, the second data rate is lower than first data rate.

7. The method according to claim 5, when the congestion status experiences low congestion, the second data rate is higher than the first data rate.

8. A system for congestion control, comprising:
a transport protocol of a first terminal configured to transmit data over a channel, transmitting extra information data or dummy data over the channel to test whether or not that channel can adapt to a higher data rate, via a processor, and receive a feedback signal from a terminal other than the first terminal that is indicative of a congestion status of the channel; and an application of the first terminal configured to transmit data to the transport protocol of the first terminal at a first data rate, receive the feedback signal from the transport protocol of the first terminal, and transmit data to the transport protocol of the first terminal at a second data rate based on the congestion status.

9. The system according to claim 8, further comprising:
an interface that is coupled between the transport protocol of the first terminal and the application of the first terminal, the interface being configured to transmit data from the application of the first terminal to the transport protocol of the first terminal, and communicate the feedback signal received from the terminal other than the first terminal from the transport protocol of the first terminal to the application of the first terminal.

10. The system according to claim 9, the interface includes an application programming interface (API) of an operating system.

11. The system according to claim 8, wherein the feedback signal is at least one of loss rate, round trip time, explicit congestion notification (ECN), error rate and a receiver estimated receiving data rate.

12. The system according to claim 8, wherein the congestion status corresponds to an average of values of the feedback signal over a period.

13. The system according to claim 8, wherein the congestion status corresponds to a sample of values of the feedback signal over a period.

14. The system according to claim 8, wherein the second data rate is smaller than the first data rate when the network experiences high congestion.

15. The system according to claim 8, wherein the second data rate is larger than the first data rate when the network experiences low congestion.

16. The system according to claim 8, wherein the application further comprises:
a first coder that is configured to match the first data rate; and a second coder that is configured to match the second data rate, the application of the first terminal being configured to encode data with the first coder, transmit the encoded data to the transport protocol of the first terminal, receive the feedback signal from the terminal other than the first terminal that is indicative of the congestion status, and switch to the second coder based on the congestion status.

17. The system according to claim 16, wherein the second data rate is lower than the first data rate, the application of the first terminal being configured to switch to the second coder when the network experiences high congestion.

18. The system according to claim 16, wherein the second data rate is higher than the first data rate, the application of the first terminal being further configured to switch to the second coder when the network experiences low congestion.

19. A computer readable medium storing program instructions for causing a controller to perform congestion control steps comprising:
transmitting data from an application of a first terminal to a transport protocol of the first terminal at a first data rate;

transmitting data over a channel;

transmitting extra information data or dummy data over the channel to test whether or not that channel can adapt to a higher data rate;

receiving a feedback signal at the transport protocol of the first terminal from a terminal other than the first terminal that is indicative of a congestion status of the channel;

communicating the congestion status of the channel from the transport protocol of the first terminal to the application of the first terminal; and transmitting data from the application of the first terminal to the transport protocol of the first terminal at a second data rate based on the congestion status.

20. The computer readable medium according to claim 19, wherein the feedback signal is at least one of loss rate, round trip time, explicit congestion notification (ECN), error rate and receiver estimated receiving data rate.

21. The computer readable medium according to claim 19, wherein the congestion status corresponds to an average of values of the feedback signal over a period.

22. The computer readable medium according to claim 19, wherein the congestion status corresponds to a sample of values of the feedback signal over a period.

23. The computer readable medium according to claim 19, when the network experiences high congestion, the second data rate is lower than first data rate.

24. The computer readable medium according to claim 19, when the network experiences low congestion, the second data rate is higher than the first data rate.

* * * * *